United States Patent
Jacquemin

(10) Patent No.: US 6,220,645 B1
(45) Date of Patent: Apr. 24, 2001

(54) DEVICE FOR SCREWLESS MOUNTING OF AN ACCESSORY

(75) Inventor: Didier Jacquemin, Luxeuil les Bains (FR)

(73) Assignee: Becker Group Europe GmbH, Suppertal (DE)

(*) Notice: Subject to any disclaimer, the term of this patent is extended or adjusted under 35 U.S.C. 154(b) by 0 days.

(21) Appl. No.: 09/070,292

(22) Filed: Apr. 30, 1998

(30) Foreign Application Priority Data

Feb. 5, 1997 (DE) .............................................. 197 18 509

(51) Int. Cl.⁷ .................................. B60N 3/02; B60J 3/02
(52) U.S. Cl. ...................... 296/97.12; 296/97.9; 296/214
(58) Field of Search .............................. 296/97.12, 97.9, 296/214; 16/DIG. 24

(56) References Cited

U.S. PATENT DOCUMENTS

| 4,913,484 | 4/1990 | Dowd et al. . |
| 4,981,323 | * 1/1991 | Dowd et al. ........................ 296/214 |
| 5,507,545 | * 4/1996 | Krysiak ............................... 296/97.9 |
| 5,560,575 | * 10/1996 | Krysiak ............................ 296/214 X |
| 5,662,375 | * 9/1997 | Adams et al. ....................... 296/214 |

FOREIGN PATENT DOCUMENTS

| 4341093 | * 6/1994 | (DE) ................................... 296/97.9 |
| 197 18 509 | 4/1998 | (DE) . |
| WO 96/17178 | 6/1996 | (WO) . |

* cited by examiner

Primary Examiner—D. Glenn Dayoan
Assistant Examiner—Jason Morrow
(74) Attorney, Agent, or Firm—Foley & Lardner

(57) ABSTRACT

In connection with a device for the screwless mounting of at least one accessory in a cutout of a vehicle support structure, the device includes a base body with locking elements formed thereon that are to be locked to the cutout edges at least one locking element being separated from the base body, and movably attached to at least one further locking element connected with the base body, a blocking wedge that can be driven between the locking elements inserted in the cutout and a detent mechanism between the base body and the locking element which is not directly connected with the base body positioned such that the base body can be supported on the locking element opposite to the insertion direction when the device has been mounted.

19 Claims, 2 Drawing Sheets

DEVICE FOR SCREWLESS MOUNTING OF AN ACCESSORY

FIELD OF THE INVENTION

The invention relates to a device for the screwless mounting of at least one accessory in a cutout of a vehicle support structure, in particular for mounting a grab handle on a body sheet metal section of a motor vehicle, with a base body having resiliently formed locking elements which can be locked on cutout edges, and with a blocking wedge which can be driven between locking elements inserted in the cutout, wherein at least one locking element is separated from the base body.

BACKGROUND OF THE INVENTION

Screwless fastening elements or devices are increasingly employed in vehicle manufacturing, in particular automobile manufacturing, for fastening accessories, in particular for the pre-assembly of entire components.

In connection with a device known from International Patent Publication WO 96/17178, the frame-shaped base body is connected with the vehicle support structure in a tension-resistant manner only on the side on which a locking element has been connected in one piece with the base body. Since the other locking element is separated from the base body because of its mobility required for the insertion into the cutout and locking behind the cutout edges, under a load it is possible for the base body to be lifted off this non-supported side of the support structure or an accessory placed against the support structure there. In case of the connecting area between the base body and the locking body becoming fatigued, this can result in a permanently gaping split. Furthermore, the local load in the connecting area between the base body and the one locking element is impracticably high, and the support force, which can normally be generated with all locking elements, can only be incompletely utilized, since only one locking element, so to speak, provides support. Laterally projecting fastening tongues are formed in the connecting area of the two locking elements, which allow pre-assembly of the device in a recess of a headliner, which thereafter in a further assembly step is anchored on the vehicle support structure by means of the same device.

OBJECT AND SUMMARY OF THE INVENTION

It is the object of the invention to create a device of the type mentioned at the outset, in the course of whose mounting it is easily possible to achieve the seating of the device, secure on all sides, in the vehicle support structure. The device furthermore is intended to make possible an easy and secure fastening in an accessory which is to be affixed on the vehicle support structure.

This object is attained by a device for the screwless mounting of at least one accessory in a cutout of a vehicle support structure, such as for mounting a grab handle on a body sheet metal section of a motor vehicle, wherein the device includes a base body having at least one resiliently formed locking element which can be locked on the edges of said cutout, at least one locking element separated from the base body, a blocking wedge that can be driven against the locking element inserted in the cutout, and a detent mechanism positioned between the base body and the locking element separated from the base body, such that in the mounted position of the device, the detent mechanism permits the base body to be supported on the locking element at least opposite to the insertion direction.

Thanks to the detent mechanism, the shaping of the one locking element in a manner advantageous to its production and mounting, without a direct connection with the base body in the mounted position of the device, has no longer a negative effect on the holding capabilities of the device. Following the end of mounting, during which the mobility of the locking element is required, the base body is solidly connected in the extraction direction from the cutout of the vehicle support structure with the locking element, which then is solidly supported at the cutout edge anyway. Even large forces acting on the device then no longer can lift the one side of the base body off the vehicle support structure. These large forces are advantageously transmitted approximately evenly to the locking elements, and from them to the support structure.

The detent mechanism is particularly suitably actuated by means of the blocking wedge, as soon as the latter is driven in for the final securing of the device. By means of this, a high degree of assurance is provided that the detent mechanism is actually and compulsorily actuated and connects the base body with the locking element in a tension-resistant manner, that it can no longer be automatically released, but nevertheless can be released again for possible disassembly after removal of the blocking wedge.

In a simple production-technological manner, the detent mechanism has at least one engagement element and one counter-engagement element, which are provided, each usefully made of one piece, on the locking element, or respectively on the base body.

In one embodiment, the engagement element is at least one protruding hook on the locking element and the counter-engagement element is at least one hook-receiving pocket in the base body. In this configuration, the engagement and counter-engagement elements can be easily manufactured by shaping technology. They require little structural space and yet assure a force transmission device which can be greatly stressed and released.

In a further embodiment, at least one of the engagement element and the counter-engagement element have an inclined tightening surface. In this manner, a coupling free of play is achieved by the inclined tightening surface, and it is even possible by means of the action of the blocking wedge to pull the base body against the support structure with pre-stress.

In another embodiment, the base body is designed as a frame with an insertion opening for the blocking wedge. On a first edge of the insertion opening a second locking element is formed that extends approximately vertically in respect to the frame through the insertion opening. The second locking element includes a support shoulder for the cutout edge and a deformable joint area at a distance behind the frame to which the first locking element, which is separated from the base body, is connected with the second locking element. The first locking element extends back to the insertion opening with an obliquely descending section and with an end section which is approximately parallel with the second locking element. The end section includes a support shoulder for extending behind the cutout edge and the engagement element of the detent mechanism. An edge of the insertion opening includes a counter-engagement element proximate the engagement element. In this embodiment, the device is advantageously shaped and great holding forces can be achieved.

In another embodiment, a raised flange area with contact surfaces surrounding the insertion opening is provided on the back of the base body facing away from the visible side of the base body. The rigidity of the shape is thereby increased by the flange area. In addition, the flange area permits a large-surfaced connection with the support structure, or respectively with an accessory arranged between the support structure and the base body, such as a headliner or the like.

For purposes of pre-assembly, the device can be attached by means of the flange area in a recess of the accessory which, in a further assembly step, is fixed in place against the vehicle support structure by means of the device.

Stable pre-fastening of the device on such an accessory can be achieved by including a cutting strip extending in the insertion direction and at least one projecting fastening bracket that is approximately parallel with and spaced apart from the base body.

A particularly practical embodiment of the invention ensues from further including at least one fastening tongue hingedly attached to the base body with the fastening tongue being movable from an insertion position into a fastening position and which, in the fastening position, protrudes outward past the perimeter of the flange area and rests against a rear surface of the accessory, and also including a connecting device between the fastening tongue and the base body with the connecting device comprising interlocking and/or frictionally connected matching connecting element for securing the fastening tongue in the fastening position. This embodiment of the invention can be easily pre-positioned on an accessory, which will be fixed in place on the support structure by means of the device in a later mounting step. The movable fastening tongues permit the simple insertion of the locking elements and of the fastening tongues in the recess of the accessory. After having been pushed through the recess, the fastening tongues are only secured in their fastening positions by the actuation of the connecting device, wherein for one they fix the base body in place on the accessory in a precisely positioned and sturdy manner, and no longer interfere with the later fastening of the accessory on the support structure by means of the device. The connecting device is releasable, so that the device can be dismounted again at any time. The holding power of the connecting device should be at least sufficiently large, so that vibrations caused by transporting the accessory equipped with such devices no longer release the prefastened devices.

In another embodiment, the device is a one-piece plastic injection-molded shaped element integrally formed with all movable and non-movable components. Preferably, a closure flap that covers the insertion opening for the locking elements on the visible side of the base body, and which suitably also supports the blocking wedge, is integrally formed with the device. However, the closure flap could also be an element which is separately produced.

The device can also be adapted for mounting a headliner or a trim plate on a body sheet metal section of a motor vehicle. To this end, the headliner can already be equipped with at least one such device in a pre-mounting step. Also, a grab handle can be fixed in place on the support structure by means of the device, wherein during pre-assembly of the device on a headliner, the grab handle could already be mounted on a bearing block, or is mounted later. In addition, the headliner and the grab handle are both fixed in place on the support structure by means of the same device, wherein the device with or without the grab handle can already be pre-fastened on the headliner.

Embodiments of the subject of the invention will be explained by means of the drawings and the following detailed description.

DETAILED DESCRIPTION OF THE PREFERRED EMBODIMENTS

Figure 1:
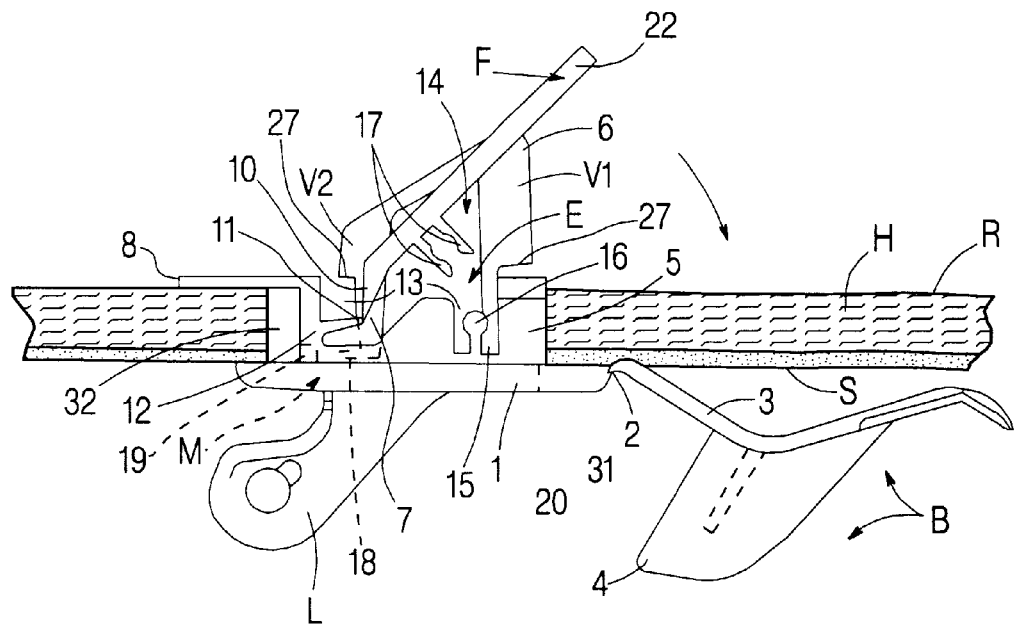
FIG. 1 represents a cross-sectional view of a device to be mounted on an accessory prior to the termination of pre-mounting.
Figure 2:
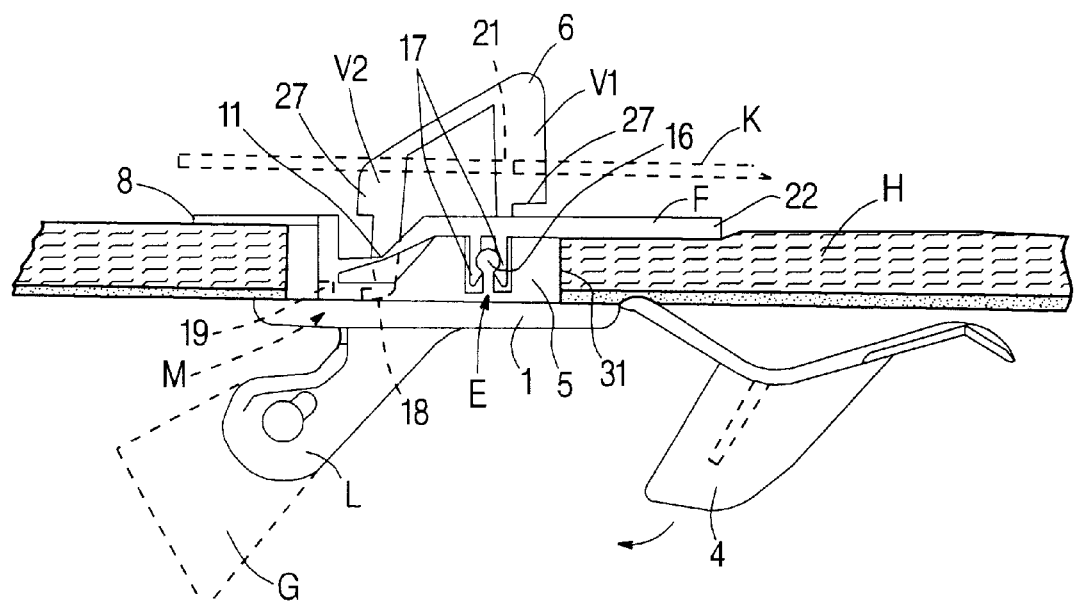
FIG. 2 represents a cross-sectional view of a device similar to the one in FIG. 1 after pre-mounting has been terminated and prior to final mounting.

A device B in accordance with FIGS. 1 and 2 is used for fixing an accessory H in place on a vehicle support structure K (drawn in dashed lines in FIG. 2), in particular during the assembly of a motor vehicle body. The accessory H can be a headliner or a trim plate or the like. As represented, the device B can also be used for fastening another accessory, in this case a grab handle G or the like, and for this purpose it is equipped with a bearing block L for the grab handle G. The bearing block L could be omitted; in that case the device B is only used for fastening the accessory H. In place of the bearing block, the device could also have at least one other fastening device for other accessories, such as a sun visor, an armrest, a rearview mirror, lighting fixtures, screen and the like.

The device suitably is a one-piece plastic injection-molded element, for example made of polyamide, and suitably has an aesthetically attractive or decorative visual side.

A closure flap 3 is pivotably connected to a frame-shaped base body 1 by means of a film hinge or a link 2 and supports a blocking wedge 4, whose purpose will be explained later. If necessary, the closure flap 3 with the blocking wedge 4 could also be a separate, shaped plastic element or shaped metal element. A protruding flange area 5 is formed on the back of the base body 1 facing away from the visual side, which surrounds an insertion opening 20 in the base body 1 and is of a height which approximately corresponds to the thickness of the accessory H which is to be fastened by means of the device. A plate-shaped locking element V1 extends approximately vertically in respect to the plane of the base body 1 from the interior of the flange area 5 in an extension of an insertion opening edge. A further locking element V2 has been connected to the locking element V1 in a knee joint-like connecting area 6, which initially extends obliquely away from the connecting area 6 and then is brought back with a free end section 7 approximately parallel with the locking element V1. The free end section 7 is not connected with the base body 1, so that the two locking elements V1, V2 are resiliently movable in respect to each other in the connecting area 6, and in the connecting area of the locking element V1 with the base body 1 are resiliently movable in respect to the latter. At least one outwardly projecting support shoulder 27 is formed on the exterior of each locking element V1, V2. Fastening brackets 8 are provided in the flange area 5 at least on one side at a distance above the base body 1 and approximately parallel with it, which can project outward past the contour of the base body 1. Furthermore, cutting strips 32 are provided on the exterior in the flange area, extending approximately in the insertion direction.

Connecting elements 12 have been provided in pockets 13 on two opposite lateral areas in the flange area 5, on which rod-shaped fastening elements F are supported by means of film hinges 11 in such a way that they are movable in planes approximately vertical in relation to the base body 1 between an insertion position indicated in FIG. 1 and a fastening position indicated in FIG. 2. The fastening elements F are fastening tongues 9, whose end sections 22 can project in the fastening position outward past the contour of the base body 1.

On the locking element V2, which is not directly connected with the base body 1, at least one outward protruding engagement element 18 is formed, for whose engagement with the base body 1, or respectively the flange area 5, a counter-engagement element 19, suitably embodied as a receiving pocket, is provided. Suitably, the engagement element 18 is a hook at the free end section 7 of the locking element V2, which can be inserted into the receiving pocket in order to couple the base body 1 with the locking element V2 in the extraction direction. These two components constitute a detent mechanism M, which suitably can be actuated by means of the blocking wedge 4 as soon as the latter is driven from below through the insertion opening 20 into the base body in order to secure the two locking elements V1, V2.

A connecting device E is furthermore provided between each fastening tongue 9 and the base body 1, which suitably operates interlockingly and/or in a frictionally connected manner and permits the fastening of the fastening tongue 9 in the fastening position. The connecting device E consists of a plier-like clip 17, for example on the underside of the fastening tongue 9, and of a thickened pin 16, oriented toward it, in a pocket 13, open at the top, of the flange area 5. These components constitute the interlocking and/or frictionally connected connecting elements 14, 15 of the device B. If not needed, the connecting device E and the fastening tongues 9 can also be omitted.

The accessory H has a visible side S and a rear R, as well as a recess 31 for inserting the device B. For pre-mounting of the device B on the accessory H prior to the mounting of the latter on the vehicle support structure K (in the body sheet metal with a cutout 21), the base body 1 (with or without the grab handle G) is inserted from the visible side S with the flange area 5, the locking elements V1, V2 and the fastening tongues 9, which are in the insertion position, into the recess 31 until the base body 1 rests against the visible side S. The fastening tongues 8, being slightly inclined, are tilted over the rear R before the fastening tongues 9 are subsequently pivoted around their film hinges 11 into the fastening position, in which their free ends 22 also rest against the rear R. During this movement of the fastening tongues 9 the connecting devices E are actuated for fixing the fastening tongues 9 in place in the fastening position. The thickened pin 10 enters the mouth of the plier-like clip 17 and holds the fastening tongue 9 in place. In this way the device is pre-mounted on the accessory H and is positioned, and cannot fall off by itself anymore (FIG. 2). The cutting strips 32, if provided, can engage the edge of the recess 31 in order to improve the positioning of the device B. So far the blocking wedge 4 has not yet been introduced into the insertion opening 20.

In a further mounting step, the accessory H is now to be fixed in place on the vehicle support structure K by means of the device B. To this end, the locking elements V1, V2 are pushed through the cutout 21 until the tops of the fastening brackets 8 and the fastening tongues 9, as well as the flange area 5, rest against the underside of the support structure K. During passage through the cutout 21 the locking elements V1, V2 are resiliently moved toward each other and in relation to the base body, until finally the support shoulders 27 extend behind the edges of the cutout 21 because of the resilient restoring forces. In order to assure the engagement of the locking elements V1, V2, or respectively to force them into their final mounting position, the blocking wedge 4 is driven through the insertion opening 20 between the locking elements V1, V2, until finally the closure flap 3 closes the insertion opening (and is fixed in place by detent elements, not represented, on the closure flap 3 and/or the blocking wedge 4).

The above mentioned steps must be performed in the reverse order for disassembly.

Figure 3:
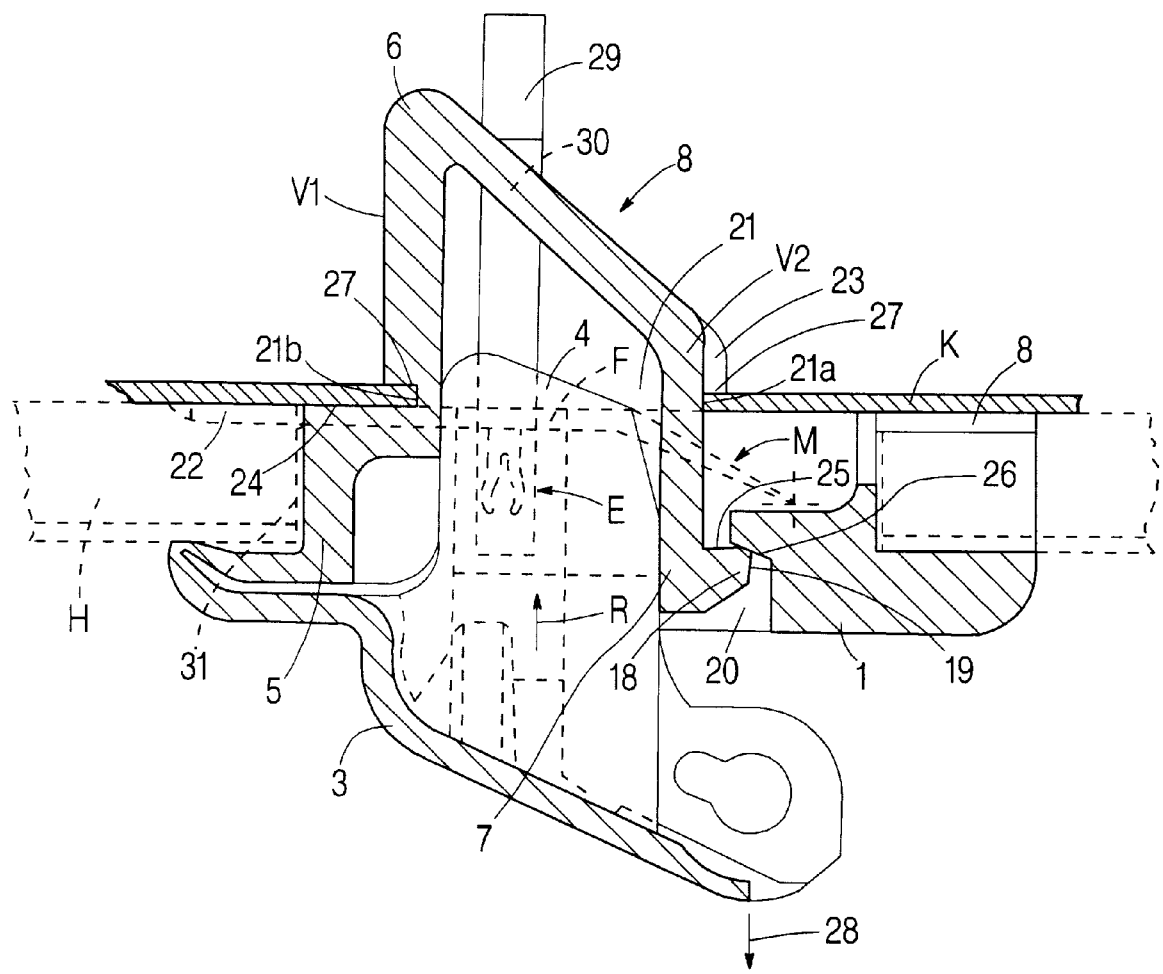
FIG. 3 represents a further embodiment of such a device in a cross-sectional view after final mounting.

The function and structure of the device B in FIG. 3 is similar to the device B in FIGS. 1 and 2. It is represented in the final mounting position, in which the accessory H is fixed in place on the support structure K and the locking elements V1, V2 have been secured and extend behind the cutout edges 21b and 21a of the cutout 21 with their support shoulders 27. By closing the closure flap 3, the blocking wedge 4 has been driven between the locking elements V1, V2 on the base body 1 in such a way that the detent mechanism M has been actuated and couples the base body 1, fixed against tension, oppositely to the insertion direction R with the free end section 7 of the locking element V2. Again, the detent mechanism is constituted by the engagement element 18, designed as a protruding hook, which has been pressed into the pocket, which is open in the direction toward the visible side of the base body 1 and defines the counter-engagement element 19. A inclined tightening surface 26 is formed in the counter-engagement element 19, which presses the flange area 5 under prestress against the support structure K. The engagement element 18 can have an undercut surface 25 or also an inclined tightening surface. One contact surface of the flange area is shown at 24. The two locking elements V1, V2 have been spread apart in the connecting area 6 by the blocking wedge 4. The support shoulder 27 at the locking element V2 is delimited by at least one outward projecting protrusion 23.

Different from FIGS. 1 and 2, respectively one tongue 29 has been formed on both sides of the locking element V2, which extends vertically in the view in FIG. 3, and which extends with its lower end as far as the insertion opening 20. Viewed in the direction of the drawing plane, the tongues 29, which are connected with the locking element V2 at 30, diverge downwardly. The detent mechanism M, shown in dashed lines in FIGS. 1 and 2, could be omitted, for example in case the device is exclusively destined for fixing the accessory H in place on the support structure K and therefore is not subjected to loads worth mentioning.

The device B in accordance with FIG. 3 can be equipped with the fastening brackets 8 and the fastening tongues F (indicated by dashed lines) which, in the fastened position, rest on the accessory H with their free ends 22 in order to fix the device B on the accessory H during pre-mounting. The fastening tongues F and the fastening brackets 8 do not necessarily have to be provided. If fastening tongues F are provided, the connecting device E is also there, which makes it possible to connect the fastening tongues F in their fastened position with the base body in an interlocked and/or frictionally connected manner as soon as the flange area 5 has been inserted into the recess 31 of the accessory H. The bearing block L is also formed on the base body, but it can also be omitted if desired.

If, in the final mounting position in FIG. 3, a force acts via the bearing block L in the direction of an arrow 28, this force is transferred to both cutout edges 21a, 21b, since the locking element V1 is directly connected with the base body 1, and the locking element V2 is connected in this force direction with the base body 1 by the actuation of the detent mechanism M.

Of course, it should be understood that changes and modifications can be made to the preferred embodiments described above. It is therefore intended that the foregoing detailed description be regarded as illustrative rather than limiting, and that it be understood that it is the following claims, including all equivalents, which are intended to define the scope of this invention.

What is claimed is:

1. A device for the screwless mounting of at least one accessory in a cutout of a vehicle support structure on a body sheet metal section of a motor vehicle, the device comprising a base body having at least one resiliently formed locking element which can be locked on the edges of said cutout, said at least one locking element being separated from the base body, a blocking wedge that can be driven against the locking element inserted in the cutout, and a detent mechanism positioned between the base body and the locking element contiguous with the base body, such that in the mounted position of the device, the detent mechanism permits the base body to be supported on the locking element at least opposite to an insertion direction and wherein the base body includes fastening brackets which contact a first side and a second side of an accessory to couple said base body to said accessory.

2. The device in accordance with claim 1, wherein the detent mechanism can be actuated by means of the blocking wedge contacting the detent.

3. A device for the screwless mounting of at least one accessory in a cutout of a vehicle support structure on a body sheet metal section of a motor vehicle, the device comprising a base body having at least one resiliently formed locking element which can be locked on the edges of said cutout, said at least one locking element being separated from the base body, a blocking wedge that can be driven against the locking element inserted in the cutout, and a detent mechanism positioned between the base body and the locking element separated from the base body, such that in the mounted position of the device, the detent mechanism permits the base body to be supported on the locking element at least opposite to an insertion direction and wherein the base body includes fastening brackets which contact a first side and a second side of an accessory to couple said base body to said accessory and wherein the detent mechanism comprises one of an engagement element and a counter-engagement element on the base body, and the other one of an engagement element and counter-engagement element on the locking element.

4. The device in accordance with claim 3, wherein the engagement element is at least one protruding hook on the locking element and the counter-engagement element is at least one hook-receiving pocket in the base body.

5. The device in accordance with claim 3, wherein at least one of the engagement element and the counter-engagement element have an inclined tightening surface.

6. The device in accordance with claim 3, wherein the base body is designed as a frame with an insertion opening for the blocking wedge, on a first edge of the insertion opening a second locking element is formed that extends approximately vertically in respect to the frame through the insertion opening, the second locking element including a support shoulder for the cutout edge and a deformable joint area at a distance behind the frame to which the first locking element, which is separated from the base body, is connected with the second locking element and first locking element extends back to the insertion opening with an obliquely descending section and with an end section which is approximately parallel with the second locking element, the end section including a support shoulder for extending behind the cutout edge and the engagement element of the detent mechanism and an edge of the insertion opening including a counter-engagement element proximate the engagement element.

7. The device in accordance with claim 6 wherein a raised flange area with contact surfaces surrounding the insertion opening is provided on the back of the base body facing away from the visible side.

8. The device in accordance with claim 7, wherein the position of the device can be secured by engaging the flange area with a recess of an accessory that is to be fixed in place on the vehicle support structure.

9. The device in accordance with claim 8, further comprising a cutting strip extending in the insertion direction and at least one projecting fastening bracket that is approximately parallel with and spaced apart from the base body.

10. The device in accordance with claim 7, further comprising at least one fastening tongue hingedly attached to the base body, the fastening tongue being movable from an insertion position into a fastening position and which in the fastening position protrudes outward past the perimeter of the flange area and rests against a rear surface of the accessory, and a connecting device between the fastening tongue and the base body, the connecting device comprising at least one of an interlocking and frictionally connected matching connecting element for securing the fastening tongue in the fastening position.

11. A device for the screwless mounting of at least one accessory in a cutout of a vehicle support structure on a body sheet metal section of a motor vehicle, the device comprising a base body having at least one resiliently formed locking element which can be locked on the edges of said cutout, said at least one locking element being separated from the base body, a blocking wedge that can be driven against the locking element inserted in the cutout, and a detent mechanism positioned between the base body and the locking element separated from the base body, such that in the mounted position of the device, the detent mechanism permits the base body to be supported on the locking element at least opposite to an insertion direction and wherein the base body includes fastening brackets which contact a first side and a second side of an accessory to couple said base body to said accessory and wherein the detent mechanism can be actuated by means of the blocking wedge contacting the detent and wherein the device is integrally formed as a one-piece plastic injection-molded shaped part on the visible side of the base body and optionally includes a closure flap that is connected with a hinge with the base body and supports the blocking wedge.

12. A device for the screwless mounting of at least one accessory in a cutout of a vehicle support structure on a body sheet metal section of a motor vehicle, the device comprising a base body having at least one resiliently formed locking element which can be locked on the edges of said cutout, said at least one locking element being separated from the base body, a blocking wedge that can be driven against the locking element inserted in the cutout, and a detent mechanism positioned between the base body and the locking element contiguous with the base body, such that in the mounted position of the device, the detent mechanism permits the base body to be supported on the locking element at least opposite to an insertion direction and wherein the base body includes fastening brackets which contact a first side and a second side of an accessory to couple said base body to said accessory and wherein the detent mechanism can be actuated by means of the blocking wedge contacting the detent and wherein the device is designed as a screwless holder for a headliner or a trim plate.

13. A device for the screwless mounting of at least one accessory in a cutout of a vehicle support structure on a body sheet metal section of a motor vehicle, the device comprising a base body having at least one resiliently formed locking element which can be locked on the edges of said cutout, said at least one locking element being separated from the base body, a blocking wedge that can be driven against the locking element inserted in the cutout, and a detent mechanism positioned between the base body and the locking element contiguous with the base body, such that in the mounted position of the device, the detent mechanism permits the base body to be supported on the locking element at least opposite to an insertion direction and wherein the base body includes fastening brackets which contact a first side and a second side of an accessory to couple said base body to said accessory and wherein the detent mechanism can be actuated by means of the blocking wedge contacting the detent and further comprising a bearing block for a grab handle disposed on the visible side of the base body.

14. The device in accordance with claim 12, further comprising a bearing block for a grab handle disposed on the base body.

15. A device for the screwless mounting of at least one accessory in a cutout of a vehicle support structure on a body sheet metal section of a motor vehicle, the device comprising a base body having at least one resiliently formed locking element which can be locked on the edges of said cutout, at least one locking element being separated from the base body, a blocking wedge that can be driven against the locking element inserted in the cutout, and a detent mechanism positioned between the base body and the locking element separated from the base body, such that in the mounted position of the device, the detent mechanism permits the base body to be supported on the locking element at least opposite to the insertion direction;

wherein the detent mechanism comprises one of an engagement element and a counter-engagement element on the base body, and the other one of an engagement element and counter-engagement element on the locking element; and wherein the engagement element is at least one protruding hook on the locking element and the counter-engagement element is at least one hook-receiving pocket in the base body.

16. The device in accordance with claim 15, wherein the detent mechanism can be actuated by means of the blocking wedge contacting the detent.

17. A device for the screwless mounting of at least one accessory in a cutout of a vehicle support structure on a body sheet metal section of a motor vehicle, the device comprising a base body having at least one resiliently formed locking element which can be locked on the edges of said cutout, at least one locking element being separated from the base body, a blocking wedge that can be driven against the locking element inserted in the cutout, and a detent mechanism positioned between the base body and the locking element separated from the base body, such that in the mounted position of the device, the detent mechanism permits the base body to be supported on the locking element at least opposite to an insertion direction and a cutting strip extending in the insertion direction and at least one projecting fastening bracket that is approximately parallel with and spaced apart from the base body.

18. The device in accordance with claim 17, wherein the detent mechanism can be actuated by means of the blocking wedge contacting the detent.

19. A device for the screwless mounting of at least one accessory in a cutout of a vehicle support structure on a body sheet metal section of a motor vehicle, the device comprising a base body having a first locking apparatus contiguous with the base body and a second locking apparatus, said first locking apparatus operable to lock and couple to the cutout of the vehicle support structure and said second locking apparatus operable to lock and couple to a first side and a second side of the accessory to engage and retain the accessory, wherein the first locking apparatus includes an engagement element having at least one protruding hook positioned on the base body and a counter-engagement element having at least one hook-receiving pocket positioned on the base body.

* * * * *